Patented Jan. 27, 1931

1,790,023

UNITED STATES PATENT OFFICE

FRITZ ROTHE, OF AACHEN, AND HANS BRENEK, OF PORZ, NEAR COLOGNE, GERMANY, ASSIGNORS TO RHENANIA VEREIN CHEMISCHER FABRIKEN A. G., OF COLOGNE, GERMANY

PROCESS FOR THE TRANSFORMATION OF GYPSUM

No Drawing. Application filed November 3, 1925, Serial No. 66,640, and in Germany December 2, 1924.

The present invention relates to a process for the transformation or decomposition of gypsum and has for its object to secure as products of this decomposition sulphuric acid and a Portland cement which contains practically neither undecomposed calcium sulphate nor excess clay.

It is known that it is possible to decompose gypsum under simultaneous separation of $SO_2$ by heating it with pure silica or sand. It has also been proposed to decompose gypsum by conducting steam over the material heated to incandescence. We have found that, by combining these two known methods, the decomposition occurs more quickly and more completely if the mixture of gypsum and silica or materials containing large quantities of silica is heated at high temperature preferably above 1100° C. in a current of inert gas, or preferably in an oxidizing atmosphere to avoid any reducing effects and in the presence of steam. By this process the sulphuric acid is split up as $SO_2$ and may be transformed in a known manner, the lime being bound to the silica in the form of primary or secondary calcium silicate according to the quantity of silica employed.

It is of particular advantage to use clay as the mixture comprising silica inasmuch as it has been discovered that practically a complete decomposition of the calcium sulfate is obtainable if clay is employed in such quantities that CaO and $SiO_2+Al_2O_3$ are at the ratio of, say, 2:1 which is preferably used in the manufacture of cement. What is incidentally obtained is a silicate free from the reduction products of the sulfate. Now if the clay or other raw materials contain iron in the form of an impurity, then, for the object of preserving the ratio $2CaO:SiO_2+Al_2O_3$, so much CaO must be calculated for the existent quantity of iron as will correspond to the ratio $1Fe_2O_3:2CaO$.

We have also found that said decomposition takes place most quickly and most completely if the steam acts on the mixture in the moment of sintering. This manner of working can be effected by blowing the steam directly into the flame generated by gas or pulverulent fuel. Instead of taking the steam from a special source it is also possible to employ a fuel rich in hydrogen being able to form, by its combustion, the steam required for the reaction, for instance oil, producer gas from lignite etc.

*Practical example*

100 parts of a Wurttemberg gypsum having the following composition:

| | |
|---|---|
| CaO | 32.46% |
| $SO_3$ | 45.49% |
| $H_2O$ | 20.58% |
| $Al_2O_3$ | 0.26% |
| $SiO_2$ | 0.92% | were mixed with 17 parts of a clay originating from the Rhineland and having this composition:

| | |
|---|---|
| CaO | 0.91% |
| $SiO_2$ | 65.23% |
| $Al_2O_3$ | 22.97% |
| $Fe_2O_3$ | 1.11% |
| Alkaline | 0.92% |
| $H_2O$ | 8.07% |

The mixture was heated in a rotary-tube kiln at a temperature of about 1200 degrees C. The raw mixture had the following analysis:

| | |
|---|---|
| CaO | 27.89% |
| $SO_3$ | 38.88% |
| $H_2O$ | 18.76% |
| $Al_2O_3$ | 3.56% |
| $Fe_2O_3$ | 0.16% |
| $SiO_2$ | 10.26% |
| Alkaline | 0.13% |

The fuel consisted of a producer gas obtained from Rhenish lignite with a high percentage of hydrogen and having this composition:

| | |
|---|---|
| CO | 31.4% |
| $CO_2$ | 4.8% |
| $CH_4$ | 2.1% |
| $H_2$ | 11.9% | and during combustion so much air was admitted to the fuel that the waste gases were free from carbon monoxide and of the following composition:

| | |
|---|---|
| $CO_2$ | 18.0 % |
| $SO_2$ | 3.94% |
| CO | 0.00% |
| O | 0.90% |

The ensuing calcined product was practically free from sulfuric acid and contained only 0.6% of $SO_3$.

Having now particularly described and ascertained the nature of our said invention and in what manner the same is to be performed, we declare that what we claim is:

1. The process for the decomposition of gypsum, which comprises mixing the gypsum with silica and heating the mixture in an oxidizing atmosphere to a temperature of more than 1100° C. by the aid of heating gases containing at least 15 vol. % of steam.

2. The process for the decomposition of gypsum, which comprises mixing the gypsum with silica and heating the mixture in an oxidizing atmosphere to a temperature of more than 1100° C. by the aid of heating gases containing at least 15 vol. % of steam, which are formed by the combustion of fuel rich in hydrogen.

DR. FRITZ ROTHE.
DR. HANS BRENEK.